United States Patent [19]

Fries et al.

[11] 4,038,125
[45] July 26, 1977

[54] METHOD FOR MOUNTING LASER FUSION TARGETS FOR IRRADIATION

[75] Inventors: R. Jay Fries; Eugene H. Farnum; Gene H. McCall, all of Los Alamos, N. Mex.

[73] Assignee: The United States of America as represented by the United States Energy Research and Development Administration, Washington, D.C.

[21] Appl. No.: 588,119

[22] Filed: June 18, 1975

[51] Int. Cl.² .................................... C09J 5/06
[52] U.S. Cl. .................................. 156/280; 156/306; 156/298; 427/282; 428/323; 428/306
[58] Field of Search ............... 156/276, 278, 280, 298, 156/306, 309; 428/325, 441, 510, 323, 327, 306, 507, 913; 176/1, 3; 427/259, 282, 256; 96/1.5, 1 PS, 1.8

[56] References Cited

U.S. PATENT DOCUMENTS

| 3,052,539 | 9/1962 | Greig | 96/1.8 |
|---|---|---|---|
| 3,154,461 | 10/1964 | Johnson | 428/306 |
| 3,331,729 | 7/1967 | Danielson et al. | 156/298 |
| 3,496,006 | 2/1970 | Rideout | 427/256 |
| 3,616,158 | 10/1971 | Rubens | 428/306 |
| 3,682,741 | 8/1972 | Elliott et al. | 156/298 |
| 3,799,827 | 3/1974 | Takimoto et al. | 96/1.5 |
| 3,915,771 | 10/1975 | Gatzke et al. | 428/325 |
| 3,933,491 | 1/1976 | Goffe et al. | 96/1 PS |
| 3,936,567 | 2/1976 | Vesely | 428/325 |
| 3,940,530 | 2/1976 | Loeb et al. | 428/325 |
| 3,946,130 | 3/1976 | Tung et al. | 428/325 |

Primary Examiner—Charles E. Van Horn
Assistant Examiner—Jerome W. Massie
Attorney, Agent, or Firm—Dean F. Carlson; Edward C. Walterscheid

[57] ABSTRACT

Methods for preparing laser fusion targets of the ball-and-disk type are disclosed. Such targets are suitable for irradiation with one or two laser beams to produce the requisite uniform compression of the fuel material.

6 Claims, 2 Drawing Figures

METHOD FOR MOUNTING LASER FUSION TARGETS FOR IRRADIATION

CROSS-REFERENCE TO RELATED APPLICATION

Application Ser. No. 485,696, now abandoned filed July 2, 1974 by Richard L. Morse for "Laser Fusion Target and Method for Using It."

BACKGROUND OF THE INVENTION

The invention described herein relates to methods for mounting laser fusion targets and more particularly to methods for producing laser fusion targets of the type disclosed and claimed in application Ser. No. 485,696.

Laser fusion depends on the use of intense, short-pulse-width laser radiation to produce thermonuclear reaction or "burn" in an appropriate fuel. The laser radiation causes the fuel to literally implode upon itself, thereby producing a density and temperature at which the burn can effectively occur. Ideally, the most efficient burn should be created by a perfectly spherically symmetric implosion of the fuel. This requires the fuel to be present in a spherical form and to be irradiated simultaneously and uniformly along its entire outer periphery or the outer periphery of its spherical container. It is readily apparent that such spherically symmetric irradiation is difficult to achieve; however, the art teaches that it can be approximated through use of a plurality of lasers and appropriate optics, with the approximation becoming better as a larger number of lasers are used. Unfortunately, simultaneous irradiation of the fuel by a large number of laser beams is not readily accomplished, especially in the anticipated environment of a laser fusion reactor.

Application Ser. No. 485,696 teaches that the number of laser beams required to produce the necessary symmetrical implosion can be reduced substantially by use of a so-called "ball-and-disk" laser fusion target in conjunction with a first low energy pulse of laser radiation to form a plasma cloud around the fuel and a second much more energetic pulse of laser radiation to act on the plasma cloud and produce the desired implosion of the fuel.

SUMMARY OF THE INVENTION

Laser fusion target microspheres are advantageously prepared for irradiation by mounting them using thin support films disposed on a suitable target holder. The support film may be any material of sufficient structural strength which does not interfere with laser irradiation, but is preferably a plastic. In one embodiment, a duplex support film is formed on a target holder with one layer of the film formed from a material which retains its structural integrity at a temperature at which the material of the other layer becomes tacky. A target microsphere is placed at a desired location on the surface of the layer which becomes tacky, and the assembly is heated to a temperature at which this layer becomes sufficiently tacky to bond the target microsphere to it. A ball-and-disk laser fusion target of a type taught in application Ser. No. 485,696 is readily prepared from this assembly by masking the tacky material beyond a desired radius from the target microsphere and depositing on the unmasked area a desired thickness of a low atomic number material. A preferred material for this purpose is polyethylene vacuum deposited on the support film and the target microsphere.

In another embodiment of the invention, the target microsphere is laminated between two plastic layers such that it resides in the plane of the support film rather than on its surface as in the case of the first mentioned embodiment. By appropriate masking, polyethylene, for example, may be vacuum deposited on both sides of the laminated support film to produce another type of ball-and-disk laser fusion target taught in application Ser. No. 485,696.

In still another embodiment of the invention, the target microsphere may be embedded in the plane of the support film by forming a thin solution of the film material on a nonmiscible liquid surface and dropping the target microsphere into the layer of material in solution at a time and with a force sufficient to penetrate the plane of the layer but not pass completely through it. The solvent is then evaporated and the resultant film containing the target microsphere embedded therein is mounted on a target holder.

DESCRIPTION OF THE PREFERRED EMBODIMENTS

In accordance with the method of the invention, laser fusion target microspheres may be mounted using very thin plastic films which can be supported in a target chamber for laser irradiation. The method is particularly well suited to the fabrication of ball-and-disk laser fusion targets of the types disclosed and claimed in application Ser. No. 485,696. An appropriate target holder is made from 75-$\mu$m-thick metal sheet, 15 cm wide and about 4 cm long with one end rounded on a 7.5 mm radius. A 4-mm-diameter hole is punched in this metal sheet on the longitudinal center line and about 7.5 mm from the rounded end.

Application Ser. No. 485,696 is incorporated herein by reference and made a part of this application. As disclosed and taught therein, a ball-and-disk laser fusion target has the following components: (a) an outer circumferential support; (b) a support membrane or film disposed within and attached to the outer circumferential support; (c) a target microsphere substantially centered on and supported by the support film, (d) a disk of readily ablatable low atomic number material deposited on the support and surrounding the target microsphere. An additional, highly desirable component (e) is a cap of the same ablatable material deposited on the target microsphere in the same hemisphere in which it is to be irradiated by laser radiation. The support film should be sufficiently thick to retain structural integrity during the manufacture of the ball and disk assembly but must not be so thick as to interfere in any substantial manner with the irradiation of the target microsphere.

Figure 1:
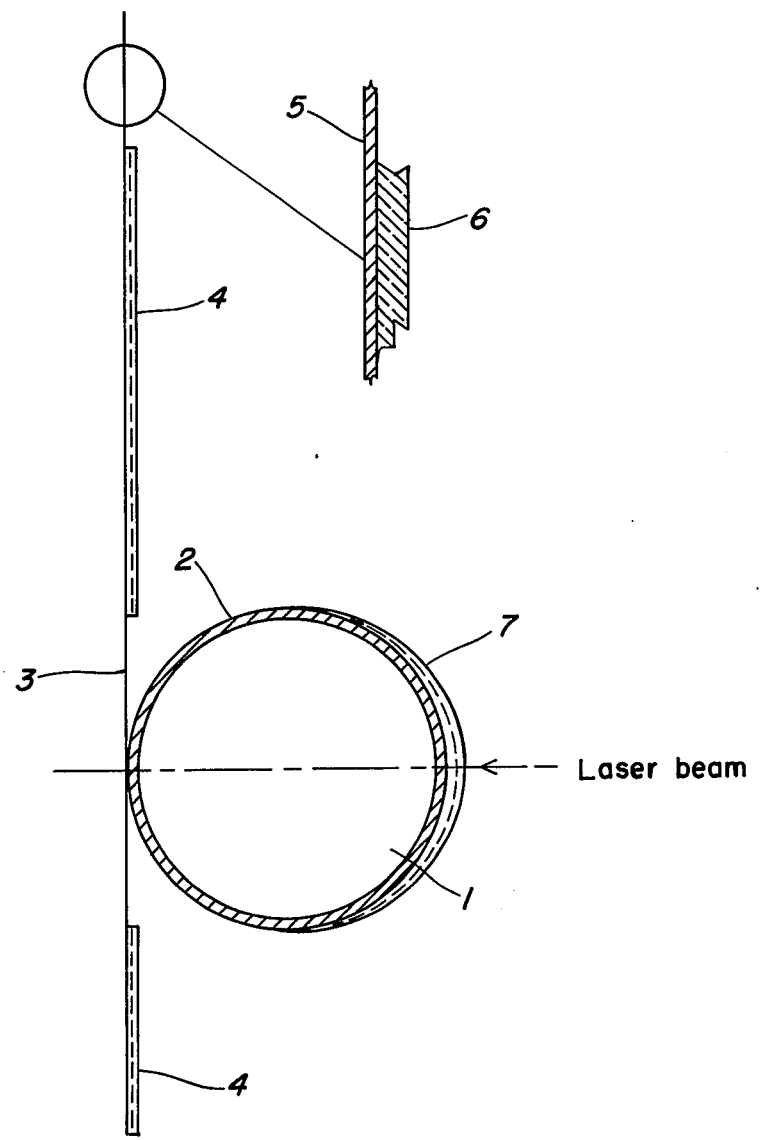
FIG. 1 is a schematic cross section of a ball-and-disk laser fusion target suitable for single-beam laser irradiation.

In an embodiment of a ball-and-disk laser fusion target suitable for single-beam laser irradiation as shown in FIG. 1, target microsphere 2 must be placed on one side of support film 3 so that ablator disk 4 is located in plane tangent to the rear of target microsphere 2. Typically, target microsphere 2 may be a glass or metal microballoon about 50 $\mu$m in diameter and containing DT gas 1 at high pressure, e.g., 50 to 100 atm. Support film 3 is a double layer consisting of a first film 5 and a second film 6. First film 5 is chosen from those materials which retain their structural strength at a temperature at which second film 6 becomes soft and tacky. Target microsphere 2 is placed on the surface of film 6 and bonded to it by heating the assembly to a temperature at which film 6 partially melts and becomes sticky but at which film 5 retains its structural strength. A quite satisfactory support film 3 is produced using about 60-nm-thick polystyrene as film 6 and about 40-nm-thick cellulose acetate as film 5. Target microsphere 2 is readily bonded to the polystyrene layer by heating the assembly to 420° K. The cellulose acetate is not affected at this bonding temperature, and it therefore provides structural support for the entire assembly during the bonding process, as well as providing substantial additional strength at room temperature. After completion of the bonding step, target microsphere 2 is firmly bonded to a very taut and fairly strong plastic film 3. It should be noted that the 100-nm-thick duplex support film 3 has advantages not found with single films of either cellulose acetate or polystyrene. Thus, for example, target microsphere 2 will not bond directly to cellulose acetate single films and 100-nm-thick polystyrene films are so fragile that they only rarely survive subsequent handling and coating operations in the preparation of the ball-and-disk targets.

Polystyrene films of the requisite thickness are readily formed by dipping a glass slide into a ~ 1% solution of polystyrene in amyl acetate and allowing the solution that adheres to the slide when it is removed from the liquid to dry and form a thin, solid polystyrene layer. This solid film is then floated off the glass slide onto a water surface and picked up from below with the metal target holder so that it spans the 4-mm-diam aperture therein. The target holder may be precoated with polystyrene by painting it with the polystyrene solution and allowing the solvent to evaporate to improve the bond between the target holder and the preformed film. The cellulose acetate films are formed by allowing a drop of cellulose acetate solution (commercial Zapon® lacquer diluted 4:1 with amyl acetate) to fall onto a liquid water surface. The drop spreads out to cover almost all available surface and the solvent evaporates to leave a solid cellulose acetate film floating on the water. The thickness of the film is readily controlled by the amount of available water surface. The polystyrene film-metal target holder assembly is then carefully placed on top of the floating cellulose acetate film so that the polystyrene surface contacts the cellulose acetate. The two plastic films adhere to each other strongly enough so that the duplex film can be carefully removed from the water surface after the excess cellulose actate is cut away. The films are allowed to dry thoroughly at room temperature before the target microspheres are mounted.

An essential component of a ball-and-disk target is a disk 4 of low atomic number, low density material which absorbs the initial pulse of laser radiation and ablates to form a thick disk-shaped plasma cloud with high thermal conductivity surrounding the target microsphere. Suitable materials for this disk include beryllium or a plastic such as polyethylene. Disk 4 may be readily be formed on support film 3 by vacuum deposition techniques. Thus, for example, a mask with a 200-$\mu$m hole may be centered over the target microsphere 2 and the assembly placed in a vacuum evaporator. Five cm below support film 3 a crucible containing about 15 mg of polyethylene is heated to 775° K for 15 minutes which evaporates the polyethylene to completion. A uniform disk 4 of polyethylene about 1 $\mu$m thick and 200 $\mu$m in diameter is formed on support film 3. At the same time, ablator cap 7 is deposited on target microsphere 2. This is advantageous in that the presence of cap 7 ensures that the second pulse of laser radiation interacts with the plasma cloud formed by the first pulse rather than directly with target microsphere 2. The thickness of the ablator disk $t$ can be tailored with distance from the sphere $r$ by employing sequential masks of different aperture or by arranging a suitable geometry between the source, mask, and sample foil. The thickness $t = f(r)$ is monotonically decreasing in both cases.

Figure 2:
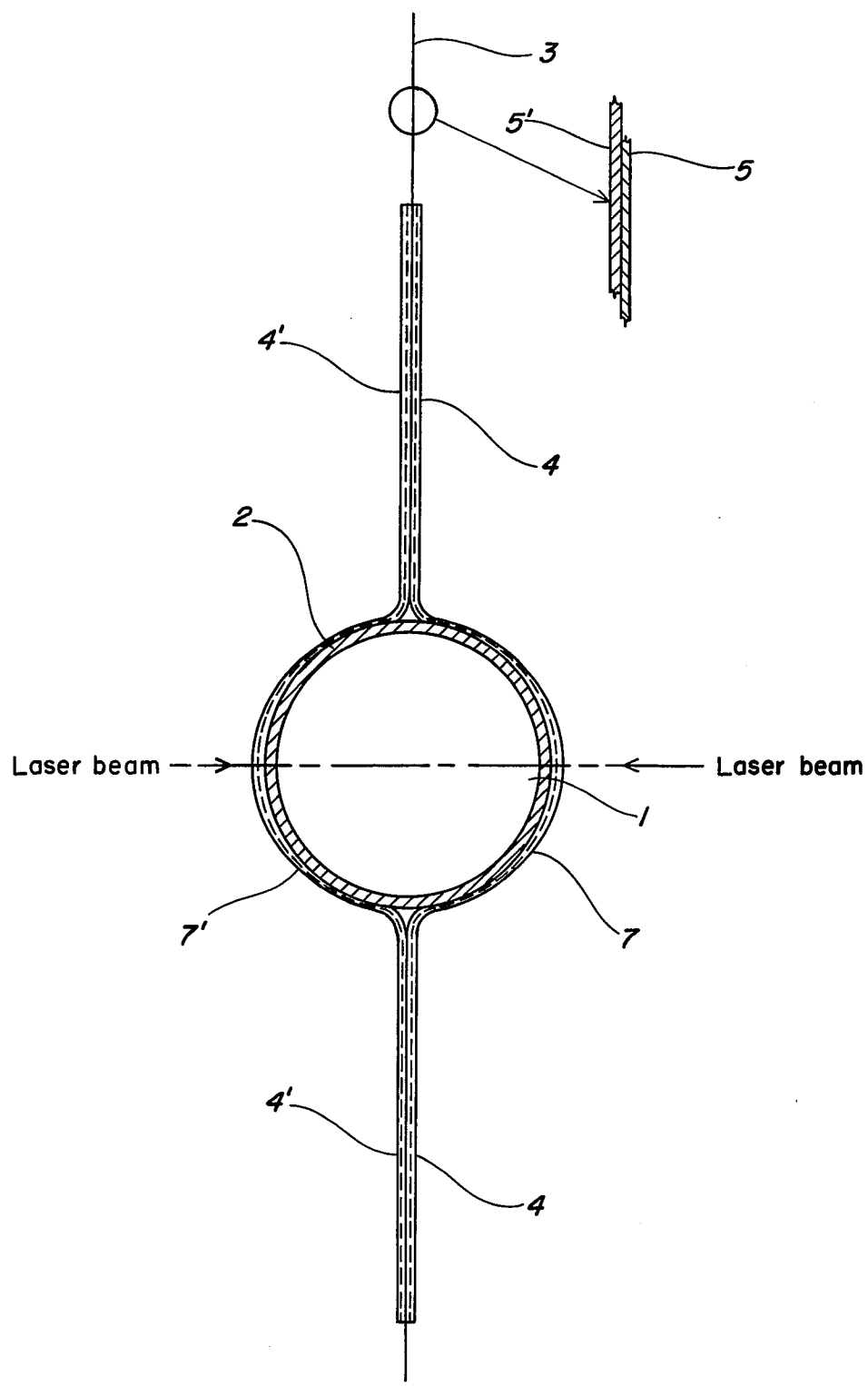
FIG. 2 is a schematic cross section of a ball-and-disk laser fusion target suitable for double-beam laser irradiation.

In a second embodiment of a ball-and-disk laser fusion target as shown in FIG. 2 which is suitable for two-beam laser irradiation, the target must be bilaterally symmetric in a plane normal to the laser axis. Thus, target microsphere 2 must be mounted in the center of the plane of support film 3 and ablator disk 4, 4' must be deposited equally on both sides of target microsphere 2. In FIG. 2, support film 3 is a duplex film 5, 5' in its central region and films 5 and 5' are preferably of the same material. Films 5 and 5' may be of any material which retains structural strength during fabrication of the target assembly and yet produces suitably thin films which bond adequately to support target microsphere 2. Cellulose acetate is quite suitable for use as films 5 and 5'.

Using cellulose acetate as support film 3, a ball-and-disk target of the type shown in FIG. 2 can be fabricated several ways. In one approach, target microsphere 2 is dropped into a film of cellulose acetate solution floating on a water surface. This captures the microsphere in the film and forms a good bond between the two as the solvent evaporates and the film cures. The position of the equator of the microsphere with respect to the film plane is a function of the force with which the microsphere is dropped into the plastic solution and the time elapsed between dropping the plastic solution onto the water surface and dropping the microsphere. Using this approach, film 3 in FIG. 2 is not a duplex film but rather only a single film which coats but one hemisphere of target microsphere 2. Support films 3 as thin as 20 nm may be used with this approach; however, it is difficult to achieve proper centering of microsphere 2 in both film 3 and the target holder.

Accordingly, a preferred approach laminates target microsphere 2 between two preformed cellulose acetate films 5 and 5'. The normal cellulose acetate solution is diluted 1:1 with amyl acetate. Film 5 formed from this diluted solution is mounted on the standard target holder heretofore described. Film 5' formed from this same solution is mounted across a 1 cm hole in a 2 × 2 × 0.1 cm aluminum plate. Target microsphere 2 is placed in the center of film 5 covering the 4 -mm hole in the standard target holder on the side of film 5 facing away from the target holder and film 5' on the aluminum frame is placed on top of microsphere 2 allowing the two films to touch so that microsphere 2 is effectively trapped between films 5 and 5' and lies substantially in the plane of joined films 5 and 5'. Film 5' is then removed from the aluminum frame and the target assembly cured at 430° K. This causes films 5 and 5' to bond together strongly even though this temperature is well below the softening point of cellulose acetate. The discus-shaped envelope thus formed around microsphere 2 has a diameter about 30% larger than that of microsphere 2 which is effectively centered in support film 3. The laminated portion of film 3 which is typically 30 to 50 nm thick is quite strong and ablator disks 4, 4' may easily be deposited thereon by vacuum deposition techniques.

What we claim is:

1. A method for mounting a laser fusion target microsphere on a thin support film which comprises (a) forming a first layer of cellulose acetate film, (b) placing a second layer of polystyrene film in intimate contact with said first layer, (c) placing said target microsphere at a desired location on said second layer, (d) heating the double layer of film to said desired elevated temperature to bond said target microsphere to said second layer, and (e) cooling said bonded assembly to a temperature below the softening temperature of said second layer.

2. The method of claim 1 wherein said support film has a thickness of about 100 nm or less.

3. A method for mounting a laser fusion target microsphere in the plane of a thin support film which comprises (a) forming first and second planar layers of the same film material which retains its structural integrity at a desired elevated temperature, (b) placing said microsphere at a desired location on said first layer, (c) placing said second layer over said target microsphere and substantially parallel to said first layer, (d) exerting downward pressure on said second layer sufficient to cause the plane of said second layer to come into intimate contact with the plane of said first film and causing the plane of said joined layers to pass substantially through the diameter of said target microsphere, (e) heating said assembly to a temperature below the softening point of said first and second layers but sufficient to bond said first and second layers along the contacting planes, and (f) cooling said bonded assembly.

4. The method of claim 3 wherein said first and second layers comprise cellulose acetate film.

5. A method for forming a ball-and-disk laser fusion target assembly suitable for single-beam laser irradiation which comprises (a) mounting a thin cellulose acetate film across the opening of a target holder, (b) placing a thin polystyrene film in intimate contact with said cellulose acetate film, (c) placing a target microsphere at a desired location on said polystyrene film, (d) heating the assembly to a temperature at which said polystyrene film becomes tacky to bond said target microsphere to said polystyrene layer, (e) cooling the assembly, (f) masking said polystyrene film beyond a desired radius from said target microsphere, and (g) depositing polyethylene to a desired thickness on the unmasked portion of said polystyrene film and on said target microsphere.

6. A method for forming a ball-and-disk laser fusion assembly suitable for double-beam laser irradiation which comprises (a) mounting a first thin cellulose acetate film across the opening of a target holder, (b) placing a target microsphere at a desired location on said first film, (c) placing a second thin planar film of cellulose acetate over said target microsphere and substantially parallel to said first film, (d) exerting downward pressure on said second film sufficient to cause the plane of said second film to come into intimate contact with the plane of said first film and causing the plane of the resultant joined first and second films to pass substantially through the diameter of said target microsphere, (e) heating the assembly to a temperature below the softening temperature of the cellulose acetate but sufficient to bond said first and second films together, (f) masking both sides of said bonded film beyond a desired radius from said target microsphere, and (g) depositing polyethylene to a desired thickness on the unmasked portions of both sides of said bonded film.

* * * * *